(12) United States Patent
Cho et al.

(10) Patent No.: US 10,454,131 B2
(45) Date of Patent: Oct. 22, 2019

(54) SECONDARY BATTERY, APPARATUS FOR MANUFACTURING THE SAME, AND METHOD OF MANUFACTURING THE SAME

(71) Applicant: SAMSUNG SDI CO., LTD., Yongin-si, Gyeonggi-do (KR)

(72) Inventors: Jaekyung Cho, Yongin-si (KR); Jinho So, Yongin-si (KR); Daewook Ki, Yongin-si (KR); Gisung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 588 days.

(21) Appl. No.: 14/686,419

(22) Filed: Apr. 14, 2015

(65) Prior Publication Data
US 2016/0006072 A1 Jan. 7, 2016

(30) Foreign Application Priority Data

Jul. 4, 2014 (KR) .......................... 10-2014-0083898

(51) Int. Cl.
*H01M 10/04* (2006.01)
*H01M 2/18* (2006.01)
*H01M 2/16* (2006.01)

(52) U.S. Cl.
CPC ......... *H01M 10/0459* (2013.01); *H01M 2/18* (2013.01); *H01M 10/0404* (2013.01); *H01M 2/1673* (2013.01)

(58) Field of Classification Search
CPC .. H01M 2/1673; H01M 2/18; H01M 10/0459; H01M 10/0525
(Continued)

(56) References Cited

U.S. PATENT DOCUMENTS 8,741,469 B2 6/2014 Ahn et al.
9,899,699 B2 2/2018 Lee
(Continued)

FOREIGN PATENT DOCUMENTS

CN 101621133 A 1/2010
CN 102044657 A 5/2011
(Continued)

OTHER PUBLICATIONS

Machine Translation of CN 101621133 A by Yueli Wang et al., Secondary Lithium Ion Battery and Preparation Method Thereof (Year: 2010).*
(Continued)

*Primary Examiner* — Milton I Cano
*Assistant Examiner* — Abibatu O Ojo-Amoo
(74) *Attorney, Agent, or Firm* — Lewis Roca Rothgerber Christie LLP

(57) ABSTRACT

A secondary battery includes a first electrode assembly comprising a first separator in a serpentine form and first and second electrode plates that are respectively located on two surfaces of the first separator at different positions; and a second electrode assembly comprising a second separator in a serpentine form and third and fourth electrode plates that are respectively located on the second separator at different positions, wherein the first separator, to which the first and second electrode plates are combined, is bent with respect to ends of the first and second electrode plates so that the portion of the first separator is located on the second separator, and the second separator, on which the third and fourth electrode plates are combined, is bent with respect to ends of the third and fourth electrode plates so that the portion of the second separator is located on the first separator.

11 Claims, 6 Drawing Sheets

(58) Field of Classification Search
USPC .................................................. 429/152, 138
See application file for complete search history.

(56) References Cited

U.S. PATENT DOCUMENTS

| | | | |
|---|---|---|---|
| 2002/0108234 A1* | 8/2002 | Zhang | H01M 10/0413 29/623.1 |
| 2010/0319187 A1 | 12/2010 | Kim et al. | |
| 2011/0052964 A1 | 3/2011 | Kim et al. | |
| 2011/0091762 A1 | 4/2011 | Ahn et al. | |

FOREIGN PATENT DOCUMENTS

| | | |
|---|---|---|
| CN | 102055004 A | 5/2011 |
| CN | 202094232 U | 12/2011 |
| KR | 10-2009-0064021 A | 6/2009 |
| KR | 10-2010-0137290 A | 12/2010 |
| KR | 10-2011-0041070 A | 4/2011 |
| KR | 10-2012-0118882 A | 10/2012 |

OTHER PUBLICATIONS

Figures from CN 101621133 A by Yueli Wang et al., Secondary Lithium Ion Battery and Preparation Method Thereof (Year: 2010).*
Chinese Office Action, with English translation, dated Sep. 26, 2018, for corresponding Chinese Patent Application No. 201510378219.X (10 pages).
Chinese Second Office Action with English Translation for corresponding Chinese Patent Application No. 201510378219.X, dated Apr. 19, 2019, 7 pages.

* cited by examiner

SECONDARY BATTERY, APPARATUS FOR MANUFACTURING THE SAME, AND METHOD OF MANUFACTURING THE SAME

CROSS-REFERENCE TO RELATED APPLICATION

This application claims priority to and the benefit of Korean Patent Application No. 10-2014-0083898, filed on Jul. 4, 2014, in the Korean Intellectual Property Office, the entire disclosure of which is incorporated herein by reference.

BACKGROUND

1. Field

One or more embodiments of the present invention relate to a secondary battery, an apparatus for manufacturing a secondary battery, and a method of manufacturing a secondary battery.

2. Description of the Related Art

Due to the technological developments and enlarged use of mobile devices such as mobile phones or laptop computers, the demand for secondary batteries as an energy source has rapidly increased. Recently, research has been actively conducted into alternative energy sources for replacing fossil fuel for use in electric vehicles or hybrid automobiles.

A stacked type electrode assembly may be manufactured and inserted into a case to form a secondary battery. The electrode assembly may be manufactured by sequentially stacking a separator and an electrode plate or by laminating electrode plates and a separator, inserting the separator between electrodes plates of different polarities, and folding the resultant structure. However, according to this method, production time is long and an operation that requires use of an additional adhesive material is needed, and thus, the production efficiency may be low.

SUMMARY

One or more embodiments of the present invention include a secondary battery, an apparatus for manufacturing a secondary battery, and a method of manufacturing a secondary battery.

Additional aspects will be set forth in part in the description which follows and, in part, will be apparent from the description.

According to one or more embodiments of the present invention, a secondary battery includes: a first electrode assembly including a first separator in a serpentine form and first and second electrode plates that are respectively located on two surfaces of the first separator at positions different from each other; and a second electrode assembly including a second separator in a serpentine form and third and fourth electrode plates that are respectively located on the second separator at positions different from each other, wherein the first separator, to which the first and second electrode plates are combined, is bent with respect to ends of the first and second electrode plates so that the portion of the first separator is located on the second separator, and the second separator, on which the third and fourth electrode plates are combined, is bent with respect to ends of the third and fourth electrode plates so that the portion of the second separator is located on the first separator.

The first electrode plate and the fourth electrode plate located on the first separator may be separated from each other in at least a portion of the first separator.

The second electrode plate and the third electrode plate located on the second separator may be separated from each other in at least a portion of the second separator.

A portion of the first separator on which the first and second electrode plates are not disposed may be longer than a portion of the first separator on which the first and second electrode plates are disposed.

A portion of the second separator on which the third and fourth electrode plates are not disposed may be longer than a portion of the second separator on which the third and fourth electrode plates are disposed.

The secondary battery may further include an adhesive member that is attached to at least one of the first separator and the second separator, portions of the first and second separators that are spaced from each other and adjacent to each other, and portions of the second separator that are spaced from each other and adjacent to each other.

The first separator may surround the ends of the third and fourth electrode plates, and the second separator may surround the ends of the first and second electrode plates.

According to one or more embodiments of the present invention, an apparatus for manufacturing a secondary battery, includes: a first unwinding unit that unwinds a first separator that is wound up; a second unwinding unit that is oriented to face the first unwinding unit and unwinds a second separator that is wound up; a first clamping unit that is spaced from the first unwinding unit and stacks first and second electrode plates on the first separator in a first clamping area and moves the first separator from the first clamping area to a stacking area and unclamps the first separator; and a second clamping unit that is spaced from the second unwinding unit and stacks third and fourth electrode plates in a second clamping area and moves the second separator from the second clamping area to the stacking area and disposes the second separator on the first separator and unclamps the second separator.

The first clamping unit may unclamp the first and second electrode plates and the first separator and then move from the stacking area to the first clamping area.

The second clamping unit may unclamp the third and fourth electrode plates and the second separator and then may move from the stacking area to the second clamping area.

The first clamping unit may be oriented to correspond to ends of the first and second electrode plates or the second clamping unit may be oriented to correspond to ends of the third and fourth electrode plates.

The first clamping unit may correspond to a center of bending of the second separator when the second clamping unit moves from the second clamping area to the stacking area to bend the second separator in an opposite direction.

According to one or more embodiments of the present invention, a method of manufacturing a secondary battery, includes: disposing a second separator on third and fourth electrode plates located on a first separator in a stacking area; moving the first separator, on two surfaces of which first and second electrode plates are stacked and which is located in a first clamping area, to the stacking area and disposing the first separator on the second separator; and moving a second separator, on two surfaces of which third and fourth electrode plates are stacked and which is located in a second clamping area, to the stacking area and disposing the second separator on the first separator.

The first separator may be bent with respect to ends of the first and second electrode plates, and the second separator may be bent with respect to ends of the third and fourth electrode plates.

The ends of the first and second electrode plates and the ends of the third and fourth electrode plates may be located in opposite directions to each other with respect to a length direction of the first and second electrode plates.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
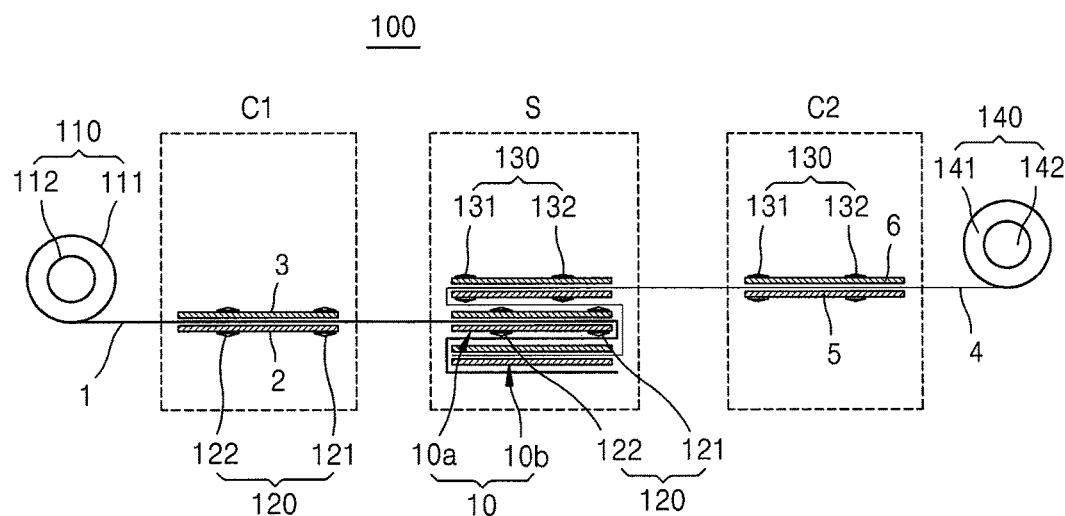
FIG. 1 is a conceptual diagram illustrating an apparatus for manufacturing a secondary battery according to an embodiment of the present invention.
Figure 2:
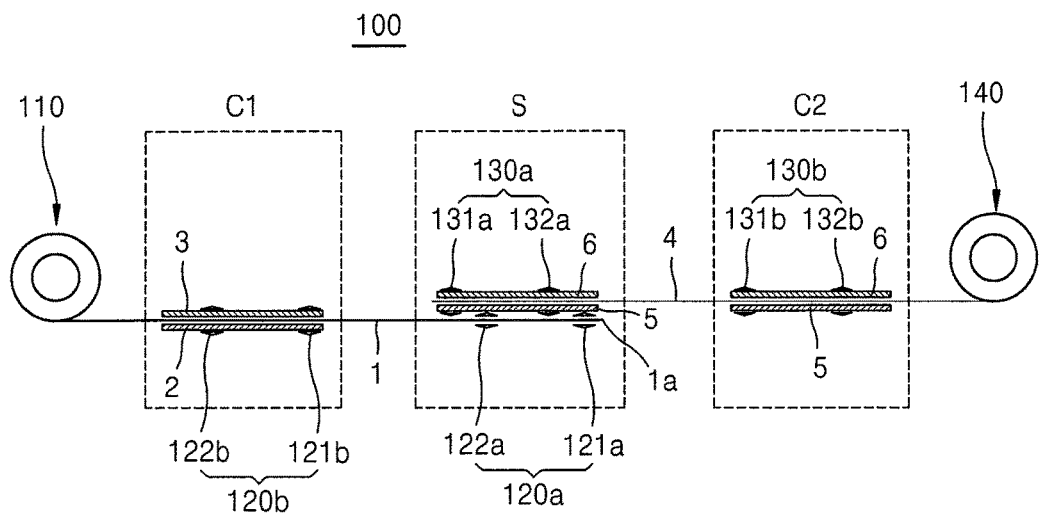
FIGS. 2 through 8 illustrate a method of manufacturing an electrode assembly by using the apparatus for manufacturing a secondary battery illustrated in FIG. 1.
Figure 3:
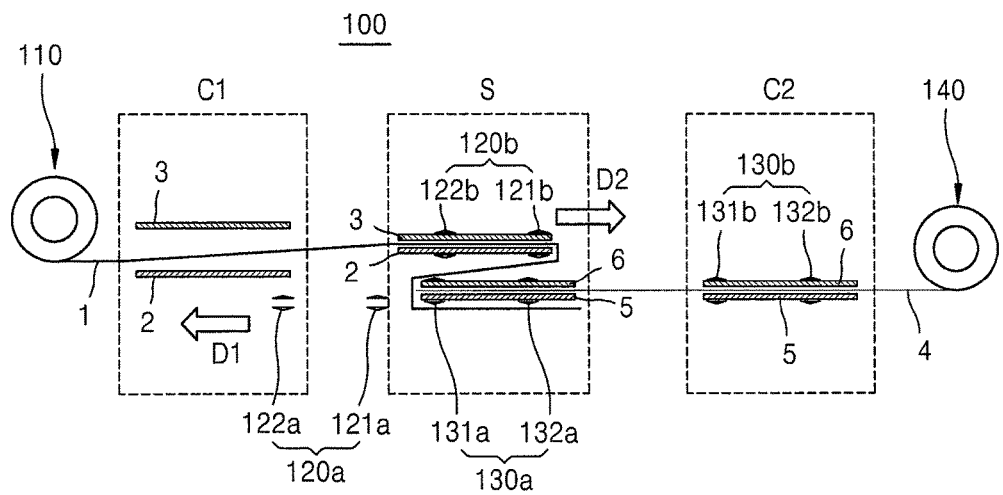
Figure 4:
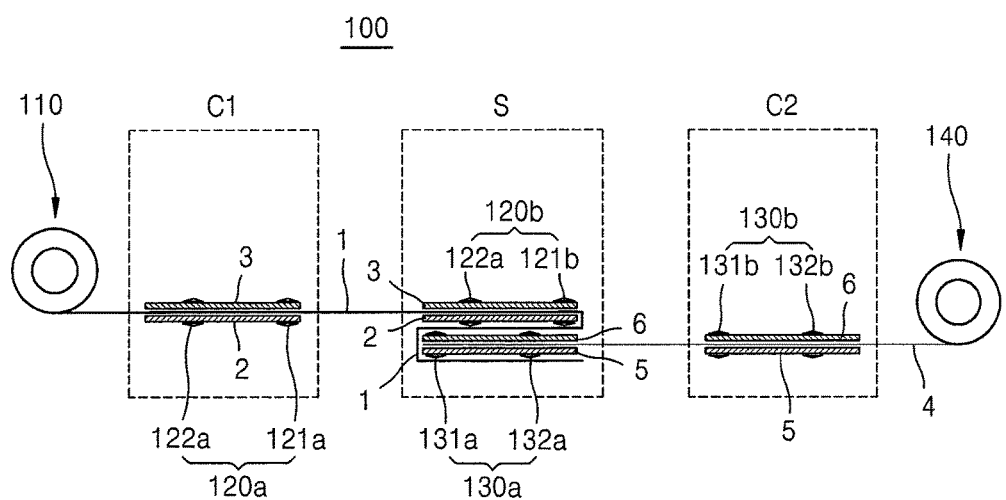
Figure 5:
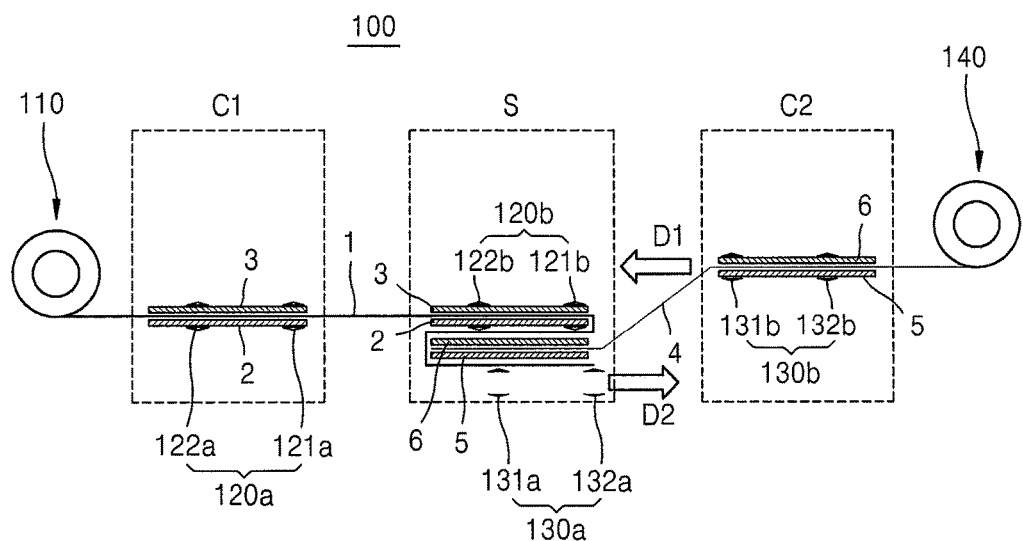
Figure 6:
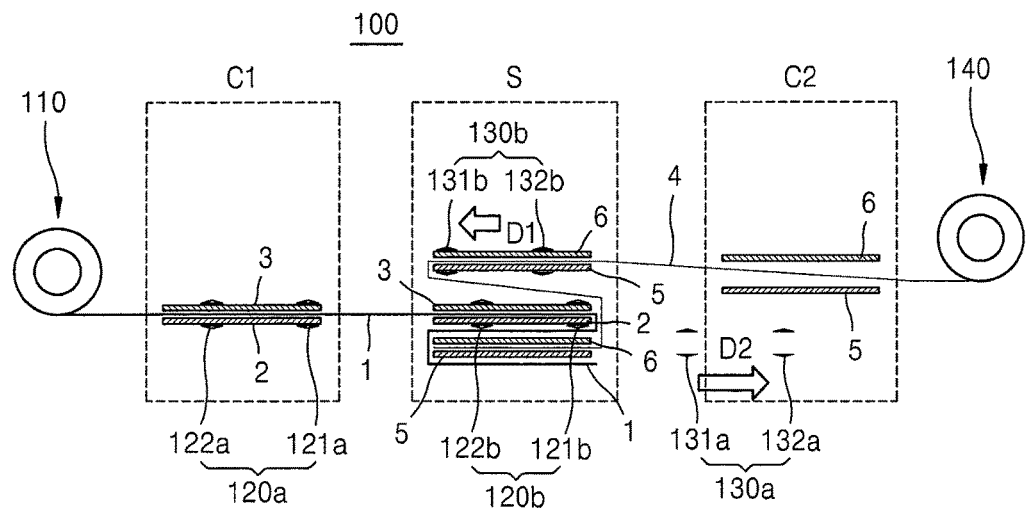
Figure 7:
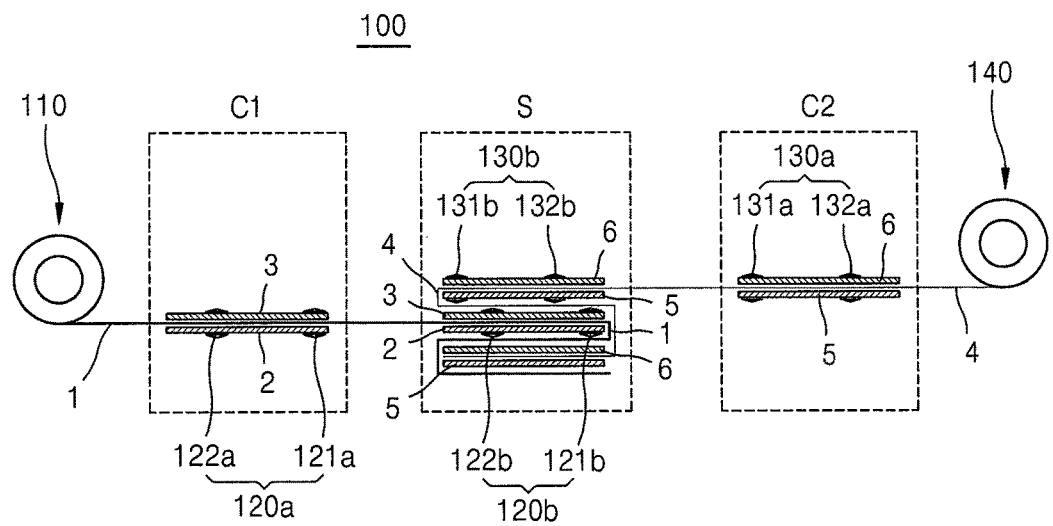
Figure 8:
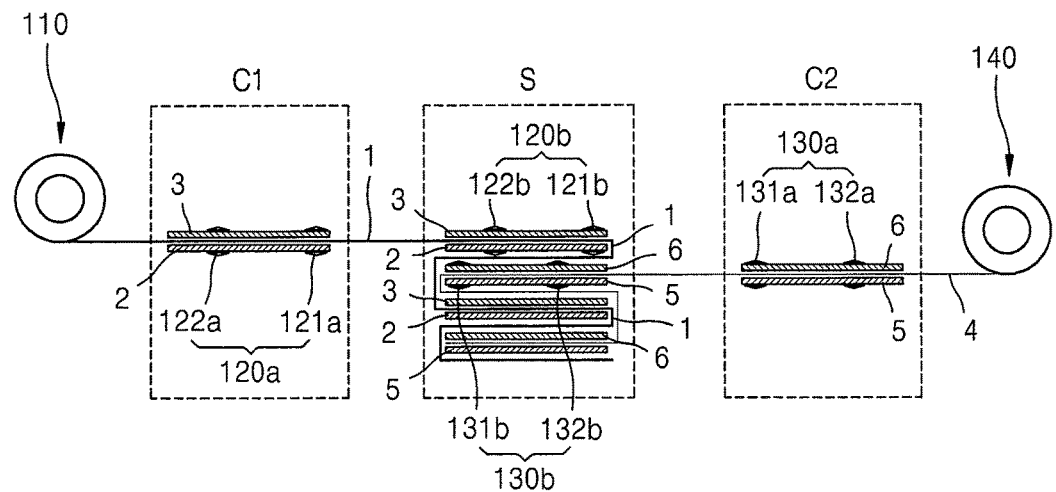

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

The advantages and features of the present invention and methods of achieving the advantages and features will be described more fully with reference to the accompanying drawings, in which exemplary embodiments of the invention are shown. The invention may, however, be embodied in many different forms and should not be construed as being limited to the embodiments set forth herein; rather these embodiments are provided so that this disclosure will be thorough and complete, and will fully convey the concept of the invention to one of ordinary skill in the art. Meanwhile, the terminology used herein is for the purpose of describing particular embodiments only and is not intended to limit the exemplary embodiments. As used herein, the singular forms "a," "an" and "the" are intended to include the plural forms as well, unless the context clearly indicates otherwise. It will be further understood that the terms "comprises" and/or "comprising" used herein specify the presence of stated features, steps, operations, and/or devices thereof, but do not preclude the presence or addition of one or more other features, steps, operations, and/or devices thereof. It will be understood that, although the terms first, second, etc. may be used herein to describe various elements, these elements should not be limited by these terms. These terms are only used to distinguish one element from another.

FIG. 1 is a conceptual diagram illustrating an apparatus 100 for manufacturing a secondary battery according to an embodiment of the present invention.

Referring to FIG. 1, the apparatus 100 for manufacturing a secondary battery may include a first unwinding unit 110, a first clamping unit 120, a second clamping unit 130, and a second unwinding unit 140.

The first unwinding unit 110 may unwind a first separator 1 after the first separator 1 is wound. The first unwinding unit 110 may include a first roller 111 on which the first separator 1 is wound and a first roller driving unit 112 that drives the first roller 111.

The first clamping unit 120 may move between a stacking area S and a first clamping area C1. Alternatively, the apparatus 100 may include one pair of first clamping units 120, wherein one element of the pair of the first clamping units 120 is located in the first clamping area C1 or the stacking area S while another element of the pair of the first clamping units 120 is located in the stacking area S or the first clamping area C1 such that the elements of the pair of the first clamping units 120 do not overlap each other in the first clamping C1 and the stacking area S, or the elements of the pair of the first clamping units may move from the first clamping area C1 to the stacking area S or from the stacking area S to the first clamping area C1 such that they do not overlap each other in either the first clamping area C1 or the stacking area S. For example, when one element of the pair of the first clamping units 120 moves from the stacking area S to the first clamping area C1, the other element of the pair of the first clamping units 120 may move from the first clamping area C1 to the stacking area S. Also, when one element of the pair of the first clamping units 120 moves from the first clamping area C1 to the stacking area S, the other element of the pair of the first clamping units 120 may move from the stacking area S to the first clamping area C1. In this case, the elements of the pair of the first clamping units 120 may move in parallel to each other while above and below each other or side by side such that their movements do not overlap each other. Hereinafter, for convenience of description, description will focus on an embodiment in which the first clamping units 120 move in parallel to each other while above and below each other such that tracks thereof do not overlap each other.

The first clamping unit 120 may include a first clamp 121 and a second clamp 122. The first clamp 121 and the second clamp 122 may be spaced from each other. Alternatively, one pair of first clamps 121 and one pair of second clamps 122 may be included in the first clamping unit 120. In this case, elements of the pair of first clamps 121 may face each other to clamp the first separator 1 or first and second electrode plates 2 and 3 and the first separator 1. Also, like the pair of first clamps 121, elements of the pair of second clamps 122 may be oriented to face each other to clamp the first separator 1 or first and second electrode plates 2 and 3 and the first separator 1.

The second clamping unit 130 may be formed in a similar manner to the first clamping unit 120. In detail, the apparatus 100 for manufacturing a secondary battery may include one pair of second clamping units 130, wherein one element of the pair of second clamping units 130 is located in a second clamping area C2 or the stacking area S while other element of the pair of the second clamping units 130 is located in the stacking area S or the second clamping area C2 such that the elements of the pair of the second clamping units 130 do not overlap each other. Also, the elements of the pair of the second clamping units 130 may move from the second clamping area C2 to the stacking area S or from the stacking area S to the second clamping area C2 such that they do not overlap each other in either the second clamping area C2 or the stacking area S. For example, when one element of the pair of the second clamping units 130 moves from the stacking area S to the second clamping area C2, the other element of the pair of the second clamping units 130 may move from the second clamping area C2 to the stacking area S. Also, when the other element of the pair of the second clamping units 130 moves from the second clamping area C2 to the stacking area S, one element of the pair of the second clamping units 130 may move from the stacking area S to the second clamping area C2. Accordingly, the elements of the pair of the second clamping units 130 may move above and below each other or in parallel to each other such that their movements do not overlap each other. Hereinafter, for convenience of description, description will focus on an embodiment in which the second clamping units 130 move in parallel to each other while above and below each other such that tracks thereof do not overlap each other.

The second clamping units 130 may include a third clamp 131 and a fourth clamp 132 that is spaced from the third clamp 131. Alternatively, one pair of third clamps 131 and one pair of fourth clamps 134 may be included. Elements of the pair of third clamps 131 may be spaced from each other or operate to approach each other so as to clamp or unclamp third and fourth electrode plates 5 and 6 and a second separator 4. Also, elements of the pair of fourth clamps 134 may also be spaced from each other or operate to approach each other to clamp or unclamp the third and fourth electrode plates 5 and 6 and the second separator 4.

The first clamping units 120 and the second clamping units 130 may operate independently from each other. Also, because the first clamping units 120 and the second clamping units 130 move simultaneously, an electrode assembly 10 may be manufactured in the stacking area S. An assembly process for the electrode assembly 10 and an operation of the apparatus 100 will be described in detail below.

The second unwinding unit 140 may be formed in the same or a similar manner as the first unwinding unit 110. In detail, the second unwinding unit 140 may include a second roller 141 that unwinds the second separator 4 after the second separator 4 is wound and a second roller driving unit 142 that drives the second roller 141.

Accordingly, the apparatus 100 for manufacturing a secondary battery may simultaneously operate the first clamping units 120 and the second clamping units 130 to sequentially stack a first electrode assembly 10*a* and a second electrode assembly 10*b*, thereby quickly manufacturing the electrode assembly 10.

An order of manufacturing a secondary battery, according to one embodiment, by using the apparatus 100 for manufacturing a secondary battery will now be described in detail.

Hereinafter, for convenience of description, one element of the pair of first clamping units 120 will be referred to as a first clamping unit (without using a reference numeral), and the other element of the pair of first clamping units 120 will be referred to as a third clamping unit (without using a reference numeral), and one element of the pair of second clamping units 130 will be referred to as a second clamping unit (without using a reference numeral), and the other element of the pair of second clamping units 130 will be referred to as a fourth clamping unit (without using a reference numeral).

In addition, for convenience of description, the first clamp 121 of the third clamping unit will be referred to as a fifth clamp (without using a reference numeral), the second clamp 122 of the third clamping unit will be referred to as a sixth clamp (without using a reference numeral), and the third clamp 131 of the fourth clamping unit will be referred to as a seventh clamp (without using a reference numeral), and the fourth clamp 132 of the fourth clamping unit will be referred to as an eighth clamp (without using a reference numeral).

FIGS. 2 through 8 illustrate a method of manufacturing an electrode assembly by using the apparatus 100 for manufacturing a secondary battery illustrated in FIG. 1.

Referring to FIGS. 2 through 8, when the first unwinding unit 110 unwinds the first separator 1, a first clamping unit 120*a* may clamp the first separator 1 in the first clamping area C1 and move the same to the stacking area S. An end of the first clamping unit 120*a* may be oriented to correspond to a starting point 1*a* of the first separator 1. In other words, an end of a first clamp 121*a* may be located at an end of the first separator 1 so as to correspond to the starting point 1*a* of the first separator 1 (see FIG. 2).

During the above operation, after the second separator 4 is unwound by the second unwinding unit 140 and transported to the second clamping area C2, the third and fourth electrodes plates 5 and 6 may be respectively transported to two sides of the second separator 4 in the second clamping area C2. The third electrode plate 5 and the fourth electrode plate 6 may be oriented to face each other with respect to the second separator 4.

Then, a second clamping unit 130*a* may clamp the third electrode plate 5, the second separator 4, and the fourth electrode plate 6. A third clamp 131*a* may clamp each end of the third electrode plate 5 and the fourth electrode plate 6. In particular, an end of the third clamp 131*a* may correspond to the end of the third electrode plate 5 and the end of the fourth electrode plate 6. A fourth clamp 132*a* may be separated from the third clamp 131*a* (see FIG. 2).

In addition, the second clamping unit 130*a* may transport the third electrode plate 5, the second separator 4, and the fourth electrode plate 6 from the second clamping area C2 to the stacking area S. The second clamping unit 130*a* may be located above the first clamping unit 120*a* so that the second separator 4 is spaced apart in a vertical direction from the first separator 1. Particularly, in this case, the third electrode plate 5, the second separator 4, and the fourth electrode plate 6 may be sequentially stacked on the first separator 1.

While the above operation is conducted, the first electrode plate 2 and the second electrode plate 3 may be respectively transported to two surfaces of the first separator 1 in the first clamping area C1. Next, the third clamping unit 120*b* may move to the first clamping area C1 to clamp the first electrode plate 2, the first separator 1, and the second electrode plate 3. A fifth clamp 121*b* may clamp an end of the first electrode plate 2 and an end of the second electrode plate 3. An end of the fifth clamp 121*b* may particularly correspond to the end of the first electrode plate 2 and the end of the second electrode plate 3. A sixth clamp 122*b* may be spaced from the fifth clamp 121*b* (see FIG. 2).

Also, in the second clamping area C2, the third electrode plate 5 and the fourth electrode plate 6 may be respectively transported to two surfaces of the second separator 4. Then a fourth clamping unit 130*b* may move to the second clamping area C2 to clamp the third electrode plate 5, the second separator 4, and the fourth electrode plate 6. A seventh clamp 131*b* may clamp the ends of the third electrode plate 5 and the fourth electrode plates 6. An end of the seventh clamp 131*b* may particularly correspond to the end of the third electrode plate 5 and the end of the fourth electrode plate 6. An eighth clamp 132*b* may be spaced from the seventh clamp 131*b*.

When the above operation is completed, the third clamping unit 120*b* may move from the first clamping area C1 to the stacking area S, and the first clamping unit 120*a* may unclamp the end of the first separator 1 and move from the stacking area S to the first clamping area C1. Particularly, in this case, the third clamping unit 120*b* and the first clamping unit 120*a* may move in a staggered manner so that their moving paths do not overlap. In addition, when the first clamping unit 120*a* unclamps the first separator 1 and the third clamping unit 120*b* moves, the second clamping unit 130*a* may apply a force to the first separator 1 to prevent the first separator 1 from moving. In this case, an additional structure may be mounted on a lower surface of the first separator 1 to support or fix the first separator 1.

When the third clamping unit 120*b* moves from the first clamping area C1 to the stacking area S as described above, the first separator 1 may be bent at an end of the second clamping unit 130*a*. In particular, the first separator 1 may be bent at the end of the third clamp 131*a*, which is also the end of the second clamping unit 130*a*, as a center of bending, starting from a first direction D1 in a second direction D2, which is an opposite direction to the first direction D1 (see FIG. 3).

During bending, the first separator 1 may surround the end of the third electrode plate 5 and the end of the fourth electrode plate 6. In this case, particularly, the end of the third electrode plate 5 and the end of the fourth electrode plate 6 may be damaged by the separator 1 due to bending thereof. As the third clamp 131*a* clamps the end of the third electrode plate 5 and the end of the fourth electrode plate 6, the first separator 1 may not be bent at the end of the third electrode plate 5 and the end of the fourth electrode plate 6 but along an external surface of the third clamp 131*a*. Accordingly, the third clamp 131*a* may prevent destruction or damage of the end of the third electrode plate 5 and the end of the fourth electrode plate 6 when the first separator 1 is bent.

When the third clamping unit 120*b* is moved to the stacking area S as described above, the third clamping unit 120*b* may be located on an upper surface of the first clamping unit 120*a*. In this case, the first separator 1 is bent and forms a U-shaped area, and the third electrode plate 5 and the fourth electrode plate 6 enter the U-shaped area of the first separator 1 (see FIGS. 3 and 4).

In addition, when the third clamping unit 120*b* is in the stacking area S, the first separator 1 may be bent at the fifth clamp 121*b*. In this case, the first separator 1 may be bent again in the first direction D1. In particular, the fifth clamp 121*b* may be located at the end of the first electrode plate 2 and the end of the second electrode plate 3 as described above. In detail, the fifth clamp 121*b* may correspond to a center of bending of the first separator 1 so as to prevent application of a force by the first separator 1 to the first electrode plate 2 when the first separator is bent. Accordingly, the fifth clamp 121*b* may prevent damage to the first electrode plate 2 when the first separator 1 is bent.

When the above operation is completed, the first separator 1, the third electrode plate 5, the second separator 4, the fourth electrode plate 6, the first separator 1, the first electrode plate 2, the first separator 1, and the second electrode plate 3 may be sequentially stacked. The stacked portions of the first separator 1 may be continuous and form a single unit. In particular, the first separator 1 may have a serpentine shape.

Next, the fourth clamping unit 130*b* may be moved from the second clamping area C2 to the stacking area S. In this case, the second clamping unit 130*a* may unclamp the third electrode plate 5, the second separator 4, and the fourth electrode plate 6 in the stacking area S and then move from the stacking area S to the second clamping area C2. Also, the third clamping unit 120*b* may press various members located under the third clamping unit 120*b* to fix them.

When the fourth clamping unit 130*b* moves from the second clamping area C2 to the stacking area S as described above, the second separator 4 may be bent at the third clamping unit 120*b*. In this case, the second separator 4 may be bent at the fifth clamp 121*b*. Also, the second separator 4 may be bent at the seventh clamp 131*b*.

As described above, the fifth clamp 121*b* may be located at the end of the first electrode plate 2 and the end of the second electrode plate 3. In this case, like the third clamp 131*a* described above, the fifth clamp 121*b* may prevent destruction of or damage to the end of the first electrode plate 2 and the end of the second electrode plate 3 when the second separator 4 is bent.

As described above, the seventh clamp 131*b* may be located at the end of the third electrode plate 5 and the end of the fourth electrode plate 6. In this case, like the fifth clamp 121*b* described above, the seventh clamp 131*b* may prevent the end of the third electrode plate 5 from being damaged when the second separator 4 is bent.

In other words, the first clamp 121*a* and the third clamp 131*a* may prevent the first electrode plate 2 from being damaged when the first separator 1 is bent. Also, the first clamp 121*a* and the third clamp 131*a* may prevent the first electrode plate 2 and the second electrode plate 3 from being damaged when the second separator 4 is bent.

The fifth clamp 121*b* and the seventh clamp 131*b* may prevent the third electrode plate 5 from being damaged when the second separator 4 is bent. Also, the fifth clamp 121*b* and the seventh clamp 131*b* may prevent the third electrode plate 5 and the fourth electrode plate 6 from being damaged when the first separator 1 is bent.

When the fourth clamping unit 130*b* is located in the stacking area S as described above, the first separator 1, the third electrode plate 5, the second separator 4, the fourth electrode plate 6, the first separator 1, the first electrode plate 2, the first separator 1, the second electrode plate 3, the second separator 4, the third electrode plate 5, the second separator 4, and the fourth electrode plate 6 may be sequentially stacked. The first separator 1 and the second separator 4 may have a serpentine shape. In particular, the first separator 1 and the second separator 4 may be arranged to be point-symmetric to each other. Also, the third electrode plate 5 and the fourth electrode plate 6 may be located in a bent portion of the first separator 1, and the first electrode plate 2 and the second electrode plate 3 may be located in a bent portion of the second separator 4.

When the above operation is completed, the first clamping unit 120*a* may clamp a portion of the first separator 1 where the first electrode plate 2 and the second electrode plate 3 are stacked in the first clamping area C1 and transport the portion of the first separator 1 to the stacking area S. In this case, the third clamping unit 120*b* may move from the stacking area S to the first clamping area C1.

Next, when the first clamping unit 120*a* is located at a correct position in the stacking area S, the fourth clamping unit 130*b* moves from the stacking area S to the second clamping area C2, and the second clamping unit 130*a* may move a portion of the second separator 4 where the third electrode plate 5 and the fourth electrode plate 6 are stacked from the second clamping area C2 to the stacking area S.

The above operation may be repeatedly performed. The first separator 1 and the second separator 4 may be continuously bent in a serpentine shape as described above. The first electrode plate 2 and the second electrode plate 3 may be separated from each other by the first separator 1, and the third electrode plate 5 and the fourth electrode plate 6 may be separated from each other by the first electrode plate 2. Also, the first electrode plate 2 and the fourth electrode plate 6 may be separated from each other by the first separator 1, and the second electrode plate 3 and the third electrode plate 5 may be separated from each other by the second separator 4.

In the above-described embodiment, a portion of the first separator 1, on which the first electrode plate 2 and the second electrode plate 3 are disposed, may be inserted into an opened portion of the second separator 4 that is bent so that the portion of the first separator 1 is located on the second separator 4. Also, a portion of the second separator 4, on which the third electrode plate 5 and the fourth electrode plate 6 are disposed, may be inserted into an opened portion of the first separator 1 that is bent so that the portion of the second separator 4 is located on the first separator 1.

Accordingly, according to the apparatus 100 for manufacturing a secondary battery and the method of manufacturing a secondary method, two of the first through fourth clamping units 120a, 120b, 130a, and 130b may be operated at the same time to stack the respective electrode assemblies 10, thereby reducing the operation time and increasing an operation efficiency.

In addition, according to the apparatus 100 for manufacturing a secondary battery and the method of manufacturing a secondary method, when the first separator 1 and the second separator 4 are bent, each electrode plate may be prevented from being damaged by using each clamp, thereby minimizing a defect ratio of products.

Figure 9:
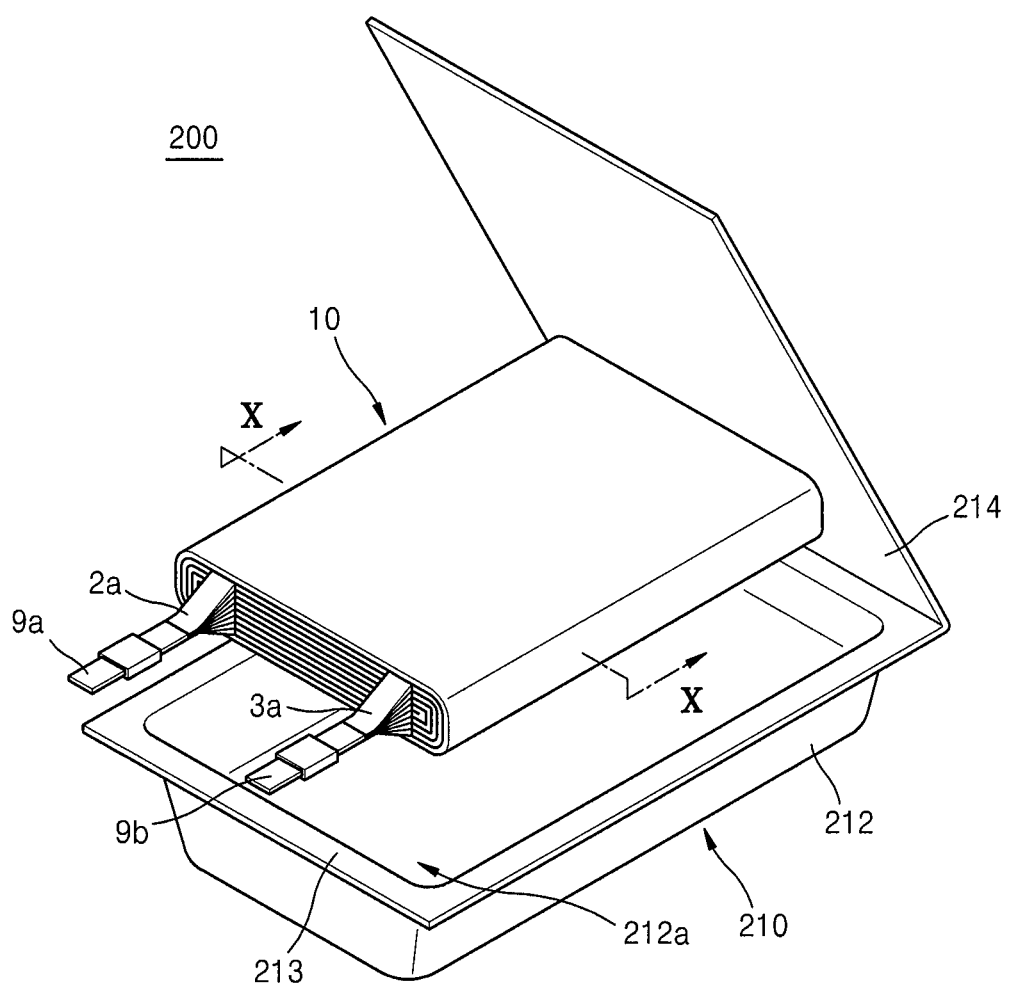
FIG. 9 is a conceptual diagram illustrating a secondary battery that is manufactured by using the apparatus for manufacturing a secondary battery illustrated in FIG. 1.
Figure 10:
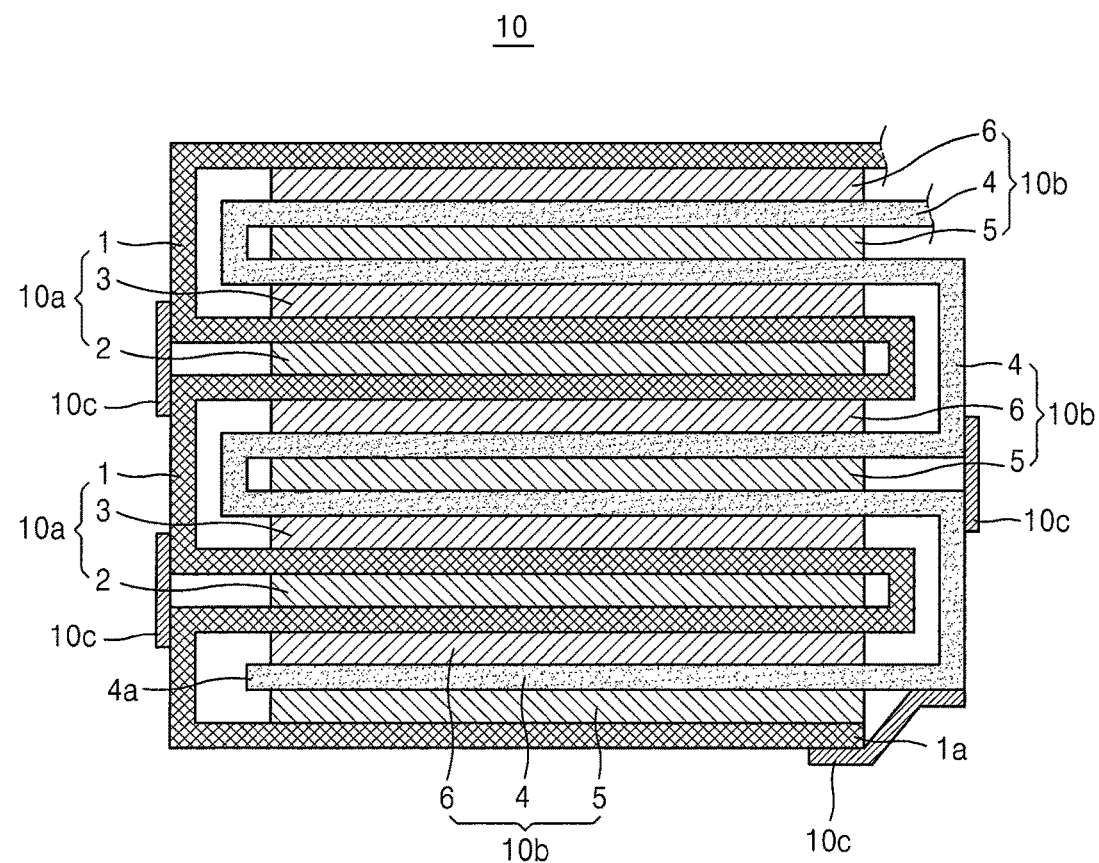
FIG. 10 is a cross-sectional view illustrating the secondary battery of FIG. 9 cut along a line X-X.

FIG. 9 is a conceptual diagram illustrating a secondary battery 200 that is manufactured by using the apparatus 100 for manufacturing a secondary battery illustrated in FIG. 1.

Referring to FIG. 9, the secondary battery 200 may include an external case 210 and an electrode assembly 10. The external case 210 may have various shapes. For example, the external case 210 may have a can shape and be formed of a metal. Also, the external case 210 may have a pouch shape and be formed of an elastic material. For convenience of description, it assumed in the description below that the external case 210 has a pouch shape.

The external case 210 includes a main body 212 and a cover 214. The main body 212 may include an accommodation portion 212a in which the electrode assembly 10 is accommodated and a sealing portion 213 that externally extends from an edge of the accommodation portion 212a. The cover 214 is integrally connected to a side of the sealing portion 213. After the electrode assembly 10 is accommodated in the accommodation portion 212a of the main body, the sealing portion 213 may be thermally fused. The external case 210 is not limited to the above-described shape and may have various shapes.

In one embodiment, the electrode assembly 10 may include a first electrode assembly 10a, a second electrode assembly 10b, and an adhesive member 10c. The first electrode assembly 10a and the second electrode assembly 10b may be bent together to in a stack-like shape.

The first electrode assembly 10a may include a first separator 1 and a first electrode plate 2 and a second electrode plate 3 that are respectively stacked on two surfaces of the first separator 1. Also, the second electrode assembly 10b may include a second separator 4, and a third electrode plate 5 and a fourth electrode plate 6 that are respectively stacked on two surfaces of the second separator 4. The first through fourth electrode plates 2, 3, 5, and 6 may be sequentially stacked on one another with respect to the same central line.

A plurality of each of first through fourth electrode plates 2, 3, 5, and 6 may be included. Each first electrode plate 2 and each second electrode plate 3 may be oriented to face each other. Also, each third electrode plate 5 and each fourth electrode plate 6 may be oriented to face each other. The plurality of first electrode plates 2 may be located on a surface of the first separator 1 at distances from one another, and the plurality of third electrode plates 5 may be located on a surface of the second separator 4 at distances from one another.

Each of the first through fourth electrode plates 2, 3, 5, and 6 may be one of a positive electrode plate or a negative electrode plate according to a collector and an active material coated on the collector. However, for convenience of description, it will be assumed in the description below that the first electrode plate 2 and the third electrode plate 5 are positive electrode plates, and the second electrode plate 3 and the fourth electrode plate 6 are negative electrode plates. Also, the first electrode plate 2 and the third electrode plate 5 are the identical or similar to each other, and the second electrode plate 3 and the third electrode plate 5 are the identical or similar to each other. Thus, for convenience of description, the description will focus on the first electrode plate 2 and the second electrode plate 3.

The first electrode plate 2 includes a positive electrode collector and a positive electrode active material coated on two surfaces of the positive electrode collector. The positive electrode collector is formed of a conductive metal plate such as aluminum. A positive electrode active material is not formed on the positive electrode collector and a positive electrode tab 2a protruded outwardly is formed on the positive electrode collector. The positive electrode tab 2a of each first electrode plate 2 is fused to a positive electrode terminal 9a that is withdrawn out of the external case 210 by using a method such as an ultrasonic welding method or a resistive welding method. The positive electrode active material includes a layered compound including lithium, a conductive material that increases conductivity, and a binder that increases a coupling force between the layered compound and the conductive material.

The second electrode plate 3 includes a negative electrode collector and a negative electrode active material coated on two surfaces of the negative electrode collector. The negative electrode collector is formed of a conductive metal plate such as copper. The negative electrode active material is not formed on the negative electrode collector and a negative electrode tab 3a that is outwardly protruded is formed on the negative electrode collector. The negative electrode tab 3a of each second electrode plate 3 is fused to a negative electrode terminal 9b that is withdrawn from the external case 210 by using a method such as an ultrasonic welding method or a resistive welding method. The negative electrode active material includes carbon such as graphite and a binder that increases a coupling force between carbon particles. Also, a tin oxide material (SnO) or a lithium titanium oxide (LTO) may be formed as the negative electrode active material. When graphite is used as the negative electrode active material, a positive electrode plate may have a smaller area than a negative electrode plate. Also, when SnO or a lithium titanium oxide is used as a negative electrode active material, the positive electrode plate may have a greater area than the negative electrode plate.

The first separator 1 and the second separator 4 as described above have a high ion transmittivity, and may be formed of a porous film, and may be formed of, for example, a polymer material such as a polyethylene or polypropylene.

The first separator 1 and the second separator 4 may each be formed to have a serpentine shape. The first separator 1 may be bent, starting from a first direction D1, in a second direction D2 and then in the first direction D1 again. In particular, the first separator 1 may be alternately bent in the first direction D1 and the second direction D2.

The first electrode plate 2 may be formed in an opposite shape to the first separator 1. For example, the second separator 4 may be symmetrical to the first separator 1 with respect to a center of the secondary battery. A starting point (or end) 1a of the first separator 1 and a starting point (or end) 4a of the second separator 4 may be in opposite directions with respect to a center of the first through fourth electrode plates 2, 3, 5, and 6.

In one embodiment, the first separator 1 and the second separator 4 do not intersect. Thus, a portion of the second separator 4 protruding in the first direction D1 may be inserted into a portion of the first separator 1 that is depressed in the first direction D1. On the contrary, a portion of the first separator 1 protruding in the second direction D2 may be inserted into a portion of the second separator 4 that is depressed in the second direction D2.

In other words, in the above-described embodiment, the first separator 1, to which the first electrode plate 2 and the second electrode plate 3 are combined, may be bent with respect to the ends of the first electrode plate 2 and the second electrode plate 3 so that the first separator 1 is located on the second separator 4, and the portion of the second separator 4, to which the third electrode plate 5 and the fourth electrode plate 6 are combined, may be bent with respect to the ends of the third electrode plate 5 and the fourth electrode plate 6 so that the second separator 4 is located on the first separator 1. The stacking as described above may be repeated.

In this case, the portion of the first separator 1, on which the first electrode plate 2 and the second electrode plate 3 are placed, is inserted into an opened portion of the second separator 4 that is bent so that the portion of the first separator 1 is located on the second separator 4, and the portion of the second separator 4, on which the third electrode plate 5 and the fourth electrode plate 6 are placed, may be inserted into an opened portion of the first separator 1 that is bent so that the portion of the second separator 4 is located on the first separator 1. In particular, the first separator 1 and the second separator 4 may be in a stack-like structure without crossing each other as described above, and a surface of the first separator 1 may be spaced from a surface of the second separator 4.

When the first through fourth electrode plates 2, 3, 5, and 6 and the first separator 1 and the second separator 4 are disposed as described above, the first electrode plate 2 and the second electrode plate 3 may be separated from each other by the first separator 1. Also, the third electrode plate 5 and the fourth electrode plate 6 may be separated from each other by the second separator 4. The first electrode plate 2 and the fourth electrode plate 6 may be separated from each other by the first separator 1, and the second electrode plate 3 and the fourth electrode plate 6 may be separated from each other by the second separator 4. Accordingly, the first through fourth electrode plates 2, 3, 5, and 6 are completely separated from one another by the first separator 1 and the second separator 4 and thus may not contact one another.

In one embodiment, portions of the first separator 1 as described above may have different lengths. In detail, a first length of a portion of the first separator 1, on which the first electrode plate 2 and the second electrode plate 3 are not disposed, may be longer than a second length of the portion of the first separator 1, on which the first electrode plate 2 and the second electrode plate 3 are disposed. In particular, the second length is be longer than the first length so as to surround the second separator 4, on which the third electrode plate 5 and the fourth electrode plate 6 are disposed.

The first separator 4 may have a similar feature. In detail, a third length of a portion of the second separator 4, on which the third electrode plate 5 and the fourth electrode plate 6 are not disposed, may be greater than a fourth length of the portion of the second separator 4, on which the third electrode plate 5 and the fourth electrode plate 6 are disposed. Accordingly, by completely surrounding the first electrode plate 2 and the second electrode plate 4 over the portion of the second separator 4 corresponding to the third length, exposure of the first electrode plate 1 and the second electrode plate 3 to the outside may be prevented.

In one embodiment, the adhesive member 10c may be adhered to at least one of the first separator 1 and the second separator 4, portions of the first and second separators 1 and 4 that are spaced from each other, and portions of the second separator 4 that are spaced from each other. The adhesive member 10c may be attached in a tape-like manner.

The adhesive member 10c may maintain the shape of the electrode assembly 10. For example, the adhesive member 10c may be mounted to surround external surfaces of the first electrode assembly 10a and the second electrode assembly 10b. The adhesive member 10c may connect portions of the first separator 1 that are spaced from each other and adjacent to each other, portions of the first electrode plate 2 that are spaced from each other and adjacent to each other, a portion between the starting point 1a of the first separator 1 and the second separator 4, and a portion between an end point of the second separator 4 and the first separator 1.

In addition, the adhesive member 10c may also be individually mounted between the portions of the first separator 1 that are spaced from each other and adjacent to each other, between the portions of the first electrode plate 2 that are spaced from each other and adjacent to each other, between the starting point 1a of the first separator 1 and the second separator 4, and between the end point of the second separator 4 and the first separator 1.

Thus, the secondary battery 200 may be manufactured to have a simple form. Also, as the first separator 1 and the second separator 4 are located at a side portion of the electrode assembly 10 of the secondary battery 200 whereas an electrode plate is not located on the side portion of the external case 210, the secondary battery 200 may be safely protected from an impact applied to the side portion of the electrode assembly 10.

The secondary battery 200 includes the first electrode assembly 10a and the second electrode assembly 10b which have a serpentine form and do not cross each other, and thus, a stacking order of electrode assemblies is simple, and each electrode plate may be accurately aligned after stacking.

As described above, according to the one or more of the above embodiments of the present invention, a secondary battery including electrode plates that are prevented from being damaged may be implemented.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A secondary battery comprising: a first electrode assembly comprising a first separator in a serpentine form and first and second electrode plates that are respectively a positive electrode plate and a negative electrode plate and located on two surfaces of the first separator that are spaced apart and facing opposite each other; and
a second electrode assembly comprising a second separator in a serpentine form and third and fourth electrode plates that are respectively a positive electrode plate and a negative electrode plate and located on two surfaces of the second separator that are spaced apart and facing opposite each other, the second electrode assembly being stacked on the first electrode assembly in a stacking direction to form a stacked assembly; and
a first adhesive layer attached to side portions of the first separator that are spaced from each other and adjacent to each other along the stacking direction and a second adhesive layer attached to side portions of the second separator that are spaced from each other and adjacent to each other along the stacking direction,
wherein the first separator, to which the first and second electrode plates are combined, is bent with respect to ends of the first and second electrode plates such that a portion of the first separator is located on the second separator, the second separator, on which the third and fourth electrode plates are combined, is bent with respect to ends of the third and fourth electrode plates such that a portion of the second separator is located on the first separator, and each of the first separator and the second separator is bent toward the stacking direction at opposite sides of the stacked assembly so as to be S-shacking, such that the side portions of the first separator are spaced apart along the slacking direction by a first gap and the side portions of the second separator are spaced apart along the stacking direction by a second gap, wherein the first and second adhesive layers bridge the respective first and second gaps, and the first gap is surrounded by the first separator, and the second gap is surrounded by the second separator, and first ends of the respective first and second separators are respectively located at the opposite sides of the stacked assembly at a first end of the stacked assembly, wherein the first separator and the second separator are continuously parallel to each other and wherein the first electrode plate of the first electrode assembly and the third electrode plate of the second electrode assembly are located between the first separator and the second separator.

2. The secondary battery of claim 1, wherein the first electrode plate and the fourth electrode plate located on the first separator are separated from each other in at least a portion of the first separator.

3. The secondary battery of claim 1, wherein the second electrode plate and the third electrode plate located on the second separator are separated from each other in at least a portion of the second separator.

4. The secondary battery of claim 1, wherein a portion of the first separator on which the first and second electrode plates are not located is longer than a portion of the first separator on which the first and second electrode plates are located.

5. The secondary battery of claim 1, wherein a portion of the second separator on which the third and fourth electrode plates are not located is longer than a portion of the second separator on which the third and fourth electrode plates are located.

6. The secondary battery of claim 1, wherein the first separator surrounds the ends of the third and fourth electrode plates, and the second separator surrounds the ends of the first and second electrode plates.

7. The secondary battery of claim 1, wherein the first separator is bent with respect to the end of the first electrode plate such that the first separator is adjacent to each of a surface of the first electrode plate facing the stacking direction and a surface of the first electrode plate facing a direction opposite the stacking direction.

8. The secondary battery of claim 7, wherein the second separator is bent with respect to the end of the third electrode plate such that the second separator is adjacent to each of a surface of the third electrode plate facing the stacking direction and a surface of the third electrode plate facing the direction opposite the stacking direction.

9. The secondary battery of claim 1, wherein second ends of the respective first and second separators are located at a second end of the stacked assembly opposite the first end of the stacked assembly along the stacking direction.

10. A secondary battery comprising: a first electrode assembly comprising a first separator in a serpentine form and first and second electrode plates that are respectively a positive electrode plate and a negative electrode plate and located on two surfaces of the first separator that are spaced apart and facing opposite each other;
a second electrode assembly comprising a second separator in a serpentine form and third and fourth electrode plates that are respectively a positive electrode plate and a negative electrode plate and located on two surfaces of the second separator that are spaced apart and facing opposite each other, the second electrode assembly being stacked on the first electrode assembly in a stacking direction to form a stacked assembly; and
a first adhesive layer that is attached to side portions of the first separator that are spaced from each other and adjacent to each other along the stacking direction and a second adhesive layer that is attached to side portions of the second separator that are spaced from each other and adjacent to each other along the stacking direction,
wherein each of the first separator and the second separator is bent toward the stacking direction at opposite sides of the stacked assembly so as to be S-shaped such that the side portions of the first separator are spaced apart along the stacking direction by a first gap, and the side portions of the second separator are spaced apart along the stacking direction by a second gap, wherein the first and second adhesive layers bridge the respective first and second gaps, and the first gap is surrounded by the first separator, and the second gap is surrounded by the second separator.

11. The secondary battery of claim 1, further comprising an adhesive member attached to the second separator and the first end of the first separator.

* * * * *